US006882507B2

United States Patent
Shiraki et al.

(10) Patent No.: US 6,882,507 B2
(45) Date of Patent: Apr. 19, 2005

(54) INTEGRATED THIN FILM HEAD WITH MAGNETO-RESISTIVE SENSOR PREVENTING SHORT CIRCUIT BETWEEN THIN FILMS

(75) Inventors: Kiyonori Shiraki, Odawara (JP); Tadashi Imanaka, Odawara (JP); Atsushi Kato, Odawara (JP); Matahiro Komuro, Hitachi (JP)

(73) Assignee: Hitachi Global Storage Technologies, Japan, Ltd., Kanagawa-ken (JP)

( * ) Notice: Subject to any disclaimer, the term of this patent is extended or adjusted under 35 U.S.C. 154(b) by 505 days.

(21) Appl. No.: 09/740,053

(22) Filed: Dec. 20, 2000

(65) Prior Publication Data

US 2001/0030840 A1 Oct. 18, 2001

(30) Foreign Application Priority Data

Apr. 13, 2000 (JP) ........................................ 2000-112166

(51) Int. Cl.[7] ............................ G11B 5/33; G11B 5/127
(52) U.S. Cl. ...................................................... 360/317
(58) Field of Search ............................... 360/313, 317, 360/318, 318.1, 322, 321, 319; 29/603.14

(56) References Cited

U.S. PATENT DOCUMENTS

| 3,731,007 | A | * | 5/1973 | Masuda et al. ............. 360/322 |
| 5,653,013 | A | * | 8/1997 | Gill et al. ................. 29/603.14 |
| 5,764,446 | A | * | 6/1998 | Seagle ......................... 360/322 |
| 5,792,546 | A | * | 8/1998 | Kanamine et al. ........... 360/320 |
| 5,907,459 | A | * | 5/1999 | Shouji et al. ................ 360/322 |
| 6,219,207 | B1 | * | 4/2001 | Pinarbasi ..................... 360/322 |
| 6,252,749 | B1 | * | 6/2001 | Hayakawa ................... 360/320 |
| 6,453,542 | B1 | * | 9/2002 | Zhu ........................ 29/603.07 |
| 6,570,743 | B1 | * | 5/2003 | Garfunkel et al. ........... 360/322 |

FOREIGN PATENT DOCUMENTS

| JP | 6-333215 | 12/1994 |
| JP | 11-238211 | 8/1999 |

* cited by examiner

*Primary Examiner*—Allen Heinz
*Assistant Examiner*—Christopher R. Magee
(74) *Attorney, Agent, or Firm*—Mattingly, Stanger, Malur & Brundidge, P.C.

(57) ABSTRACT

An integrated thin film head comprises, in order to prevent short-circuit among the lead layer, upper lead layer and shield layers, a lower shield layer formed on a substrate, a lower readgap layer formed on the lower shield layer, an MR sensor layer formed on the lower readgap layer, a lead layer jointed with the MR sensor layer, an upper lead layer formed in contact with a part of the lead layer, an upper readgap layer formed to cover the MR sensor layer, lead layer and upper lead layer and an upper shield layer formed on the upper readgap layer. The part of the lead layer in contact with the upper lead layer is formed thinner than the part not contact with the upper lead layer.

12 Claims, 6 Drawing Sheets

INTEGRATED THIN FILM HEAD WITH MAGNETO-RESISTIVE SENSOR PREVENTING SHORT CIRCUIT BETWEEN THIN FILMS

BACKGROUND OF THE INVENTION

1. Field of the Invention

The present invention relates to an integrated thin film head comprising an MR sensor and the manufacturing method thereof, and particularly to an integrated thin film head that can prevent short-circuit among thin films and a method of manufacturing the same head.

2. Description of the Related Arts

An integrated thin film head comprising an MR (Magneto-Resistive Effect) sensor that is generally used in a magnetic disc apparatus integrates an inductive head element for data recording and an MR sensor for data reproduction and an electric resistance between the connecting pinouts of this MR sensor layer is desired to be as lower as possible in order to suppress thermal noise and prevent drop of S/N. As the technique to lower the electric resistance between the connecting pinouts of this MR sensor layer, the Japanese Unexamined Patent Publication No. H11-238211, for example, discloses a technique to provide a lead layer (lead conductive layer) of the double-layer structure for the MR sensor and provide a second lead conductive layer near to the MR sensor.

On the other hand, in the thin film head in the recent years, an interval between a shield layer and the MR sensor tends to be narrowed with increase of magnetic recording density and this interval is generally determined depending on the thickness of non-magnetic layer formed on and/or under the MR sensor.

When the interval between the shield layer and MR sensor is narrowed in the integrated thin film head of the related art, here rises a discrepancy that thin film manufacturing yield is lowered because adhesion of non-magnetic layer for the sputtering is deteriorated due to a level-different area (stepped area) between the lead layer and upper lead layer, and thereby a thinner area may be susceptible to cause of a short-circuit between the shied layer and upper lead layer.

In view of overcoming this discrepancy, the Japanese Unexamined Patent Publication No. H6-333215, for example, proposes a structure wherein the stepped area of lead layer is formed as a very smooth tapered-shape to improve coverage of an insulation layer (upper shield gap) and thereby generation of short-circuit between the lead layer and upper shield layer can be prevented.

Figure 3:
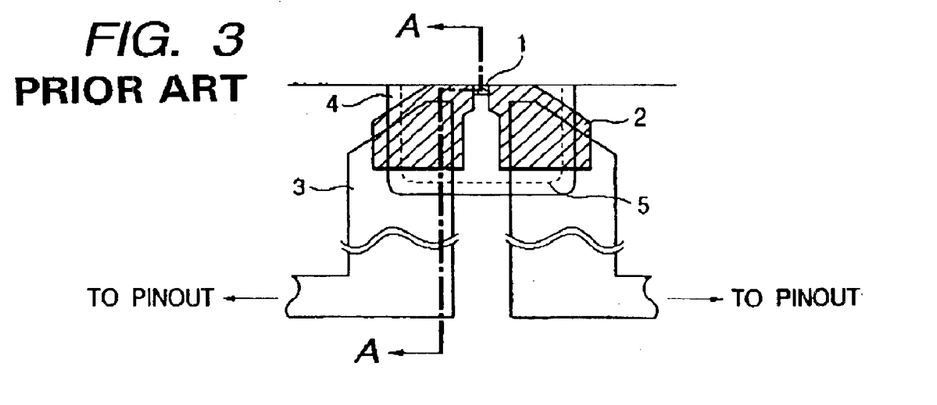
FIG. 3 is a plan view of a structure of the thin film head.

In more practical, the integrated thin film head disclosed in above patent unexamined application comprises, like FIG. 3 illustrating the plan view of the head, an MR sensor layer 1, a couple of lead layers 2 connected across the MR sensor layer 1, an upper lead layer 3 conductive to the lead layer 2, and a lower shield layer 4 and an upper shield layer 5 for magnetically shielding these layers. In FIG. 3, the MR sensor layer 1, lead layer 2, upper lead layer 3 and lower shield layer 4 are illustrated in perspective through a write element and upper shield layer 5.

Figure 2:
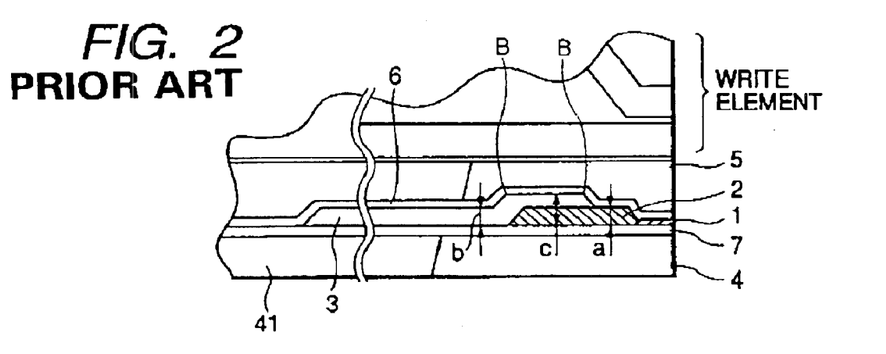
FIG. 2 is a cross-sectional view of a thin film head of the related art.

As illustrated in FIG. 2 illustrating the A—A cross-sectional view of FIG. 3, this integrated thin film head is formed by forming the lower shield layer 4 and a stepped area filler material 41 of the lower shield layer on a substrate and an undercoat layer (not illustrated) formed on the substrate, stacking a lower readgap layer 7 on the lower shield layer 4 and the filler material 41, forming the MR sensor layer 1 on such gap layer, forming a lead layer 2 joined on the sloping surface of the MR sensor layer 1, forming an upper lead layer 3 by the lift-off method on the lead layer 2 and moreover stacking thereon an upper readgap layer 6 and an upper shield 5.

The integrated thin film head disclosed in the Japanese Unexamined Patent Publication No. H11-238211 has a problem, when it has employed a structure that the upper lead layer (second lead conductive layer) is provided near the MR sensor layer, that a large stepped area is generated in the side of the MR sensor layer due to the thickness of the lead layer (first lead conductive layer) and the upper lead layer (second lead conductive layer), this stepped area deteriorates adhesion of the lead gap layer and such deterioration is inferior to the gap layer that is narrowed with high density recording.

Moreover, the integrated thin film head forming the smooth tapered-area disclosed in the Japanese Unexamined Patent Publication No. H6-333215 that will be explained later also has a problem that the part where the smooth tapered-area (sloping area of the upper readgap layer 8 in FIG. 2) is formed thin, it is difficult in this case to reduce the electric resistance and it also becomes difficult to maintain the stable resistance in such smooth tapered-area because the tapering shape is fluctuated.

In other words, the integrated thin film head of the related art that will be explained later has a problem that since the upper lead layer 3 is formed on the lead layer 2, thickness c of the stepped area at the stacking part of the lead layer and upper lead layer becomes equal to the sum of the lead layer thickness a and upper lead layer thickness b, the thickness c (=a+b) becomes larger than that when there is no upper lead layer 3, therefore adhesion of the upper readgap layer 6 to the upper corner part 8 of the upper lead layer is rather deteriorated than that at the flat area, and thereby it will be susceptible to cause of short-circuit with the upper shield layer 5.

As explained above, the integrated thin film head of the related art has a problem that a resistance value across the connecting pinouts of the head having the structure that the upper, lead layer is formed near the MR sensor layer becomes small and it is difficult to obtain the stable resistance value.

SUMMARY OF THE INVENTION

An object of the present invention is to eliminate the problems of the related arts and specifically to provide a highly reliable, low resistance and high performance integrated thin film head that can prevent generation of a short-circuit among a lead layer, upper lead layer and a shield layer and also provide a method of manufacturing the same head.

In view of attaining the object explained above, the present invention proposes an integrated thin film head comprising an undercoat layer formed on a substrate, a lower shield layer formed on the surface of the undercoat layer, a filler material filling the stepped area of the lower shield layer, a lower readgap layer formed on the lower shield layer and filler material, an MR sensor formed at the position facing to the opposite surface of a write medium on the lower readgap layer, a lead layer joined with the MR sensor at the reverse side to the opposite surface of the write medium, an upper lead layer formed extending in the reverse direction in contact with a part of the lead layer, an upper readgap layer formed to cover the MR sensor, lead layer and upper lead layer and an upper shield layer formed on the upper readgap layer, wherein the thickness of the part not in contact with the upper readgap layer of the lead layer is formed thinner than the part in contact with the upper readgap layer as the first characteristic, the lower shield layer is covered in the surface with the MR sensor and lead layer in the smaller area than that of such layer in the thin film head as the second characteristic, and an additional protective layer of lower readgap is included between the lower shield layer, filler material, and lower shield layer, and/or an additional protective layer of upper readgap is included between the upper readgap layer and upper shield layer as the third characteristic.

The present invention also proposes a method of manufacturing an integrated thin film head comprising an undercoat layer formed on a substrate, a lower shield layer formed on the surface of the undercoat layer, a filler material filling the stepped area of the lower shield layer, a lower readgap layer formed on the lower shield layer and filler material, an MR sensor formed at the position facing to the opposite surface of a write medium on the lower readgap layer, a lead layer joined with the MR sensor at the reverse side to the opposite surface of the write medium, an upper lead layer formed extending in contact with a part of the lead layer, an upper readgap layer formed to cover the MR sensor, lead layer and upper lead layer and an upper shield layer formed on the upper readgap layer, and moreover proposes a method of manufacturing the same integrated thin film head, comprising, as the fourth characteristic, the first step to form flat lower shield layer and non-magnetic filler material on the undercoat layer formed on a substrate and to form a lower readgap layer on the lower shield layer and filler material, the second step to form the MR sensor at the position facing to the opposite surface of a write medium on the lower readgap layer and to form the lead layer joined with the MR sensor in the reverse side to the opposite surface of the write medium, the third step to form the lift-off profile photoresist pattern such as resist where the upper lead layer is an aperture, the fourth step to execute the process to reduce, with the ion milling or the like, the thickness of the part not contact with the upper readgap layer of the lead layer to become thinner than the part in contact with the upper readgap layer using the lift-off profile photoresist pattern as the mask, the fifth step to form the upper lead layer on the lead layer using the lift-off profile photoresist pattern as the mask, the sixth step to remove the lift-off profile photoresist pattern and the seventh step to cover the MR sensor, lead layer and upper lead layer with the upper readgap layer, wherein the lower shield layer formed in the first step is covered with the flat surface of the MR sensor and lead layer and is formed in the area smaller than that of above MR sensor and lead layer as the fifth characteristic in the method of manufacturing the integrated thin film had and, moreover, a step to provide the lower shield layer formed in the first step and the additional protective layer of lower readgap between the filler material and lower readgap layer and/or a step to form the upper readgap layer formed in the seventh step and the additional protective layer of upper readgap between the upper readgap layer and upper shield layer as the sixth characteristic are also comprised in the method of manufacturing the integrated thin film head.

DESCRIPTION OF THE PREFERRED EMBODIMENTS

The principle of the present invention will be explained first. In general, generation of short-circuit among the MR sensor layer, lead layer, upper lead layer and shield layer is determined at the thinnest part of the intermediately formed readgap layer. This readgap layer must be formed at the stepped area of the upper lead layer and MR sensor layer. And particularly, the bias sputtering method in which a bias potential is applied to a substrate is just suitable to form a readgap layer because a dense layer can be formed even at the lower part of the sharp stepped area.

However, the layer by the bias sputtering method is formed while the surface is hit with ions and therefore the upper corner part of upper lead layer of the stepped area is formed thin. This event becomes distinctive as the stepped level difference becomes larger. Therefore, the readgap layer tends to become thinner at the upper corner part of the lead layer, upper lead layer and MR sensor layer. Accordingly, in the case where the readgap layer is formed on the lead layer of the double-layer structure, a short-circuit is susceptible to occurrence in this part.

It is desirable to eliminate such event to form a thick readgap layer, but it is required to form a thin readgap layer at the surface opposing to a medium, resulting in contradiction.

Therefore, in the present invention, the stepped area is formed in the lower height by stacking the upper lead layer on the lead layer including the thinner stacking part of the lead layer and upper lead layer. Thereby, the problems explained above can be solved and the low resistance, higher performance and highly reliable integrated thin film head may be manufactured. The integrated thin film head and the method of manufacturing the same head as the first embodiment of the present invention will be explained below.

Figure 1:
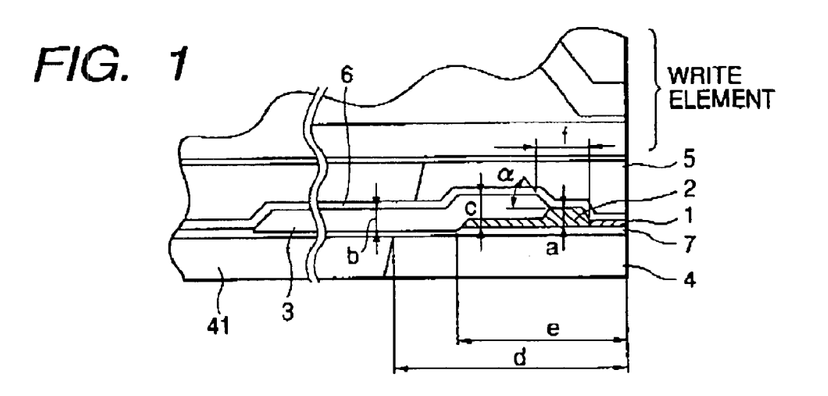
FIG. 1 is a cross-sectional view of a thin film head as a first embodiment of the present invention.

FIG. 1 illustrates a cross-sectional view of the integrated thin film head as the first embodiment of the present invention. In the integrated thin film head of this embodiment, as illustrated in FIG. 1, the lower shield layer 4 and the stepped area filler material 41 of the lower shield layer are formed on the substrate and the undercoated layer (not illustrated) formed on the substrate, the lower readgap layer 7 is stacked as the upper layer of the lower shield layer 4 and filler material 41, the MR sensor layer 1 is formed thereon, the lead layer 2 is formed joining on the sloping surface of the MR sensor layer 1, the upper lead layer 3 is formed by the lift-off profile photoresist pattern as the upper layer of the lead layer 2 and moreover the upper readgap layer 6 and upper shield layer 5 are stacked as the upper layers.

Particularly, the thin film head of this embodiment is formed, as illustrated in the figure, in such a manner that the upper lead layer 3 rides over the lead layer 2 and the lead layer 2 at the part where the upper lead layer 3 is overlapped is formed thinner than the lead layer 2 where the upper lead layer is not overlapped. Thereby, thickness c of the overlapping area of the lead layer 2 and upper lead layer 3 becomes smaller than the sum of the thickness a of lead layer and the thickness b of the upper lead layer and thereby excellent adhesion of the upper readgap layer 6 on the upper corner part 8 upper lead layer 3 can be attained. Thereby, the thin film head of the present embodiment can prevent short-circuit with the upper shield layer 5 and accordingly the integrated thin film head including a low resistance MR sensor layer can be attained.

Moreover, according to the present embodiment, since the stepped level difference (c–a) can be reduced by lowering the thickness c, an angle k of the corner part of the upper lead layer can be increased without lowering adhesion of the readgap layer 6 at the upper corner part of the upper lead layer and a resistance can further be reduced by shortening a distance f between the upper lead layer 3 and the MR sensor layer 1.

Next, a method of manufacturing the integrated thin film head of the present invention will be explained with reference to FIG. 4. FIG. 4 is a diagram for explaining the manufacturing process corresponding to FIG. 1.

Figure 4A:
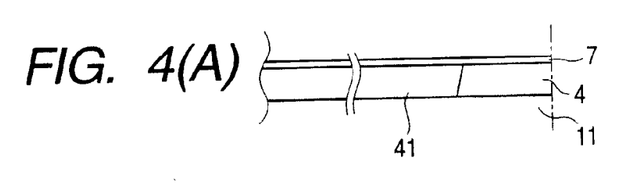
FIG. 4 is a diagram for explaining a method of manufacturing the thin film head as the first embodiment of the present invention.

In the manufacturing method of this embodiment, first, as illustrated in FIG. 4(A), the lower shield layer 4 of Permalloy or the like is formed with plating, sputtering or the etching by ion milling or the like on the undercoat layer 11 of alumina, etc. formed on the substrate, subsequently the surface is flattened by depositing alumina or the like to the whole surface thereof, then polishing the surface and then lapping the surface, a non-conductive filler material 41 is formed with the upper surface almost matched with the upper surface of the lower shield layer 4, and the lower readgap layer 7 of alumina, $SiO_2$, SiC or the like is then formed by the sputtering method on such filler material 41.

Figure 4B:
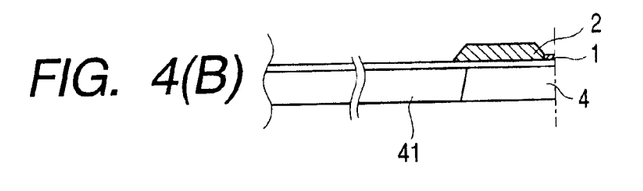
Figure 4C:
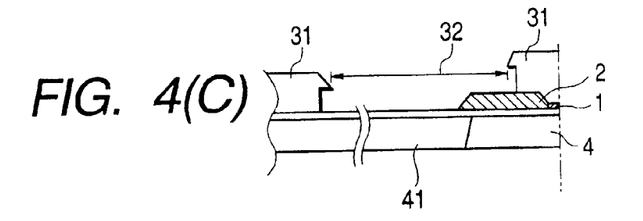
Figure 4D:
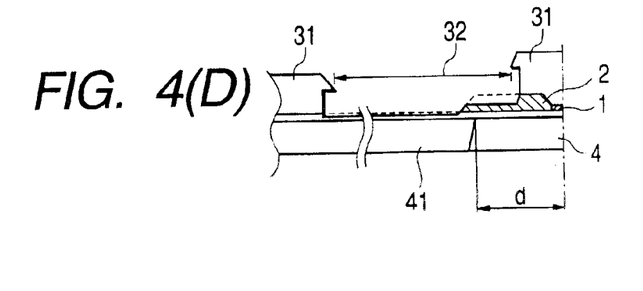

Next, in this manufacturing method, as illustrated in FIG. 4(B), the MR sensor layer 1 and the lead layer 2 are formed on the lower readgap layer 7. Thereafter, as illustrated in FIG. 4(C), the lift-off profile photoresist pattern 31 such as resist where the part on which the upper lead layer 3 is formed is formed as the aperture 32 is then formed and moreover the lead layer 2 is processed to become thinner with the ion milling method, etc. using the lift-off profile photoresist pattern 31 as the mask as illustrated in FIG. 4(D).

Figure 4E:
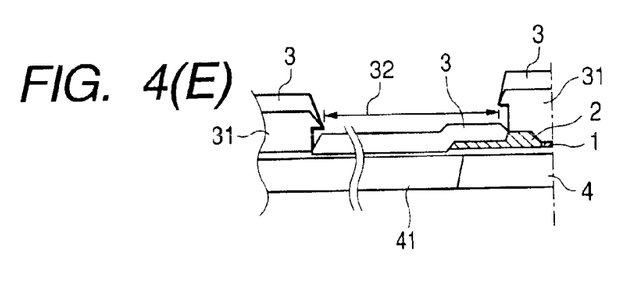
Figure 4F:
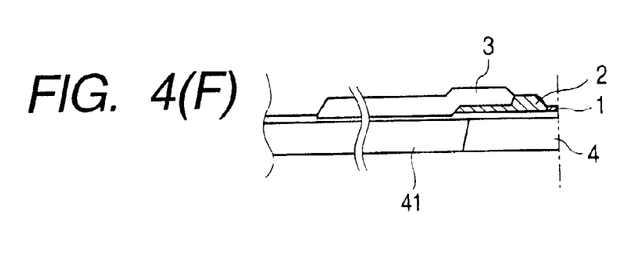
Figure 4G:
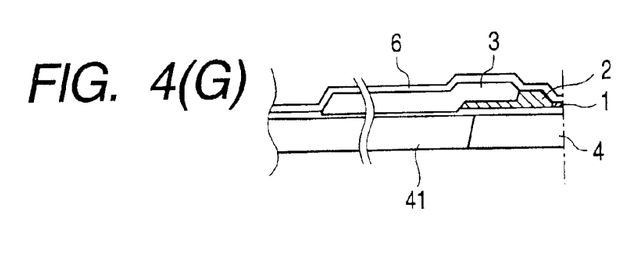

Next, in this manufacturing method, as illustrated in FIG. 4(E), after the upper lead layer 3 consisting of Au or Cu, etc. is deposited on the whole surface, the lift-off profile photoresist pattern 31 is removed and then the upper lead layer 3 is formed only on the aperture 32 as illustrated in FIG. 4(F). Thereafter, as illustrated in FIG. 4(G), the upper readgap layer 6 is formed only on the upper lead layer 3 and moreover the upper shield layer 5 and inductive head element for writing are formed, thereby, to form a magnetic head.

As explained above, in the manufacturing method of this embodiment, since the thickness c of the lead layer 2 illustrated in FIG. 1 is reduced to provide a small stepped level difference (c–a), the angle k of the corner part of the adhesion of upper lead layer can be enlarged without deterioration of deposition property of the upper readgap layer 6 at the upper corner part of the upper lead layer and thereby generation of short-circuit between the lead layer and upper lead layer and upper shield layer can be prevented.

As explained above, this manufacturing method is intended to prevent generation of the short-circuit between the lead layer and upper shield layer, but it is also thought that as illustrated in FIG. 1, the lower readgap layer 7 at the part where the lead layer does not exist among the part where the upper lead layer 3 is formed becomes thinner during the ion milling process to the lead layer 2, and thereby the short-circuit between the lower shield layer 4 and upper lead layer 5 may be susceptible to occurrence on the contrary.

Therefore, in this embodiment, as a measure to overcome such problem, the length d of the lower shield layer 4 is set shorter than the length e of the lead layer 2 (refer to FIG. 1) in the side opposing to the storage medium and the shape of the lower shield layer 4 is set smaller than the flat shape of the lead layer 2 of the upper lead layer forming area. Thereby, this embodiment can provide a thin film head having excellent reliability by covering the lower shield layer 4 with the lead layer 2 in order to prevent generation of short-circuit even when the lower readgap layer 7 becomes thinner due to the ion milling method.

Next, the integrated thin film head and the method of manufacturing the same head of the other embodiment of the present invention will be explained with reference to FIG. 5 and the subsequent figures.

Figure 5:
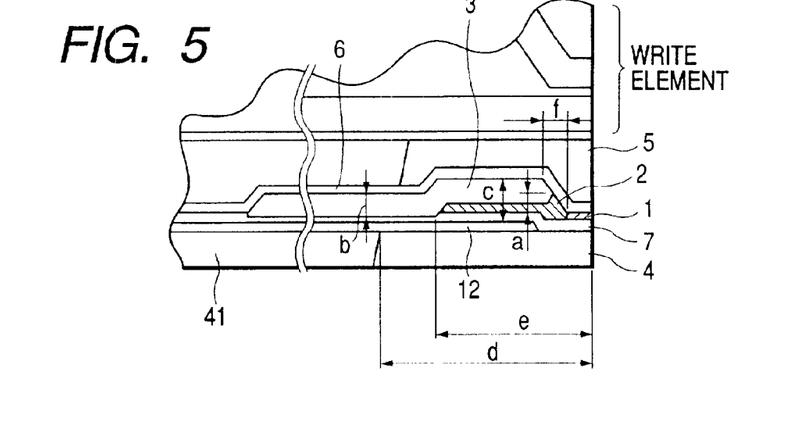
FIG. 5 is a diagram for explaining the thin film head as a second embodiment of the present invention.

First, differences from the embodiment of FIG. 1 of the integrated thin film head illustrated in FIG. 5 are that length d of the lower shield layer is longer than the length e of the lead layer and that an additional protective layer 12 is provided between the lower readgap layer 7 and the lower shield layer 4. This additional protective layer 12 is formed of a non-magnetic layer of alumina, $SiO_2$ or SiC, etc. and it is formed at the part except for the area under the MR censor layer 1.

The thin film head structured as explained above can prevent generation of a short-circuit, on the occasion of forming the upper lead layer 3, between the lower shield layer 4 and upper lead layer 3 by compensating for thickness of the lower readgap layer 7 that has become thinner due to the ion milling, etc. Here, the additional protective layer 12 may be formed on the lower readgap layer.

Figure 8A:
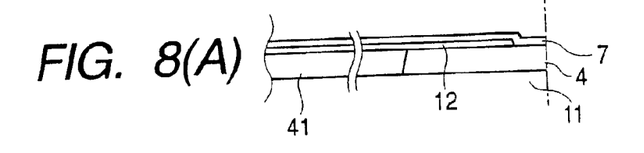
FIG. 8 is a diagram for explaining a method of manufacturing the thin film head as the second embodiment of the present invention.

In this thin film head manufacturing method, as illustrated in FIG. 8. the lower shield layer 4 of Pezmalloy or the like is formed, as illustrated in FIG. 8(A), with the plating, sputtering or etching with ion milling method, etc. on the undercoat layer 11 of alumina or the like formed on the substrate, subsequently the alumina, etc. is deposited to the whole surface and the surface is polished and is then flattened with lapping or the like, the non-conductive filler material 41 is formed with the upper surface thereof almost in matching with the upper surface of the lower shield layer 4, the non-magnetic additional protective layer 12 such as alumina, $SiO_2$, SiC or the like is formed thereon and moreover the lower readgap layer 7 of alumina, $SiO_2$, SiC or the like is formed by the sputtering method.

Figure 8B:
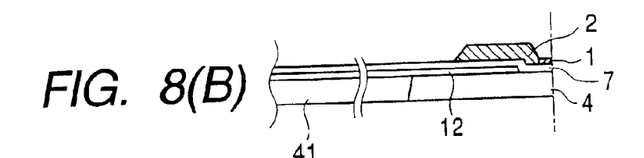
Figure 8C:
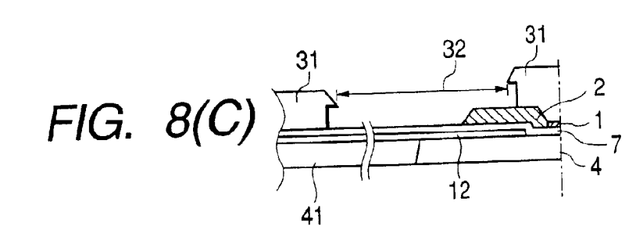
Figure 8D:
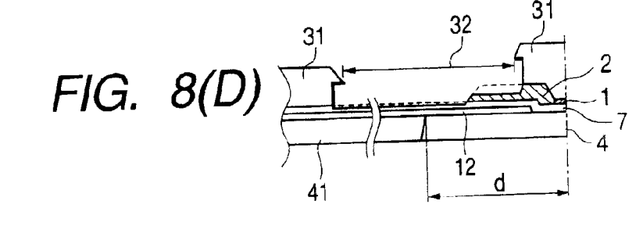
Figure 8E:
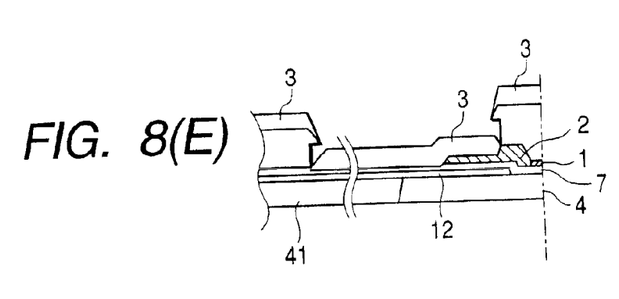
Figure 8F:
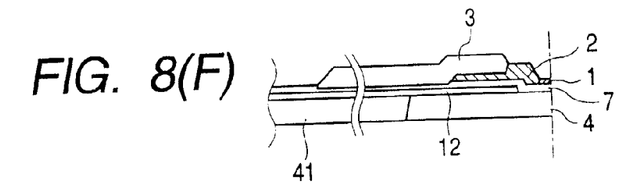
Figure 8G:
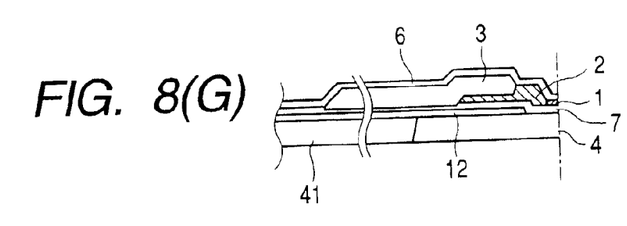

Next, this manufacturing method manufactures a magnetic head by forming, as illustrated in FIG. 8(B), the MR sensor layer 1 and lead layer 2 on the lower gap layer 7, thereafter forming, as illustrated in FIG. 8(C), the lift-off profile photoresist pattern 31 of the resist or the like where the part on which the upper lead layer 3 is formed is an aperture, moreover executing, as illustrated in FIG. 8(D), the process to reduce thickness of the lead layer 2 with the ion milling process or the like using the lift-off profile photoresist pattern 31 as the mask, then removing, as illustrated in FIG. 8(E), the lift-off profile photoresist pattern after the deposition of the upper lead layer 3 consisting of Au, Cu or the like to the whole surface, then forming the upper lead layer 3 only on the aperture 32 as illustrated in FIG. 8(F), thereafter forming the upper readgap layer 6 on the upper lead layer 3, etc. as illustrated in FIG. 8(G) and then forming the upper shield layer 5 and the inductive head element for writing data.

In the manufacturing method of this embodiment, as explained above, thickness c of the lead layer 2 is reduced to lower the stepped level difference (c–a) in order to prevent generation of short-Circuit between the lead layer 2 and the upper lead layer 3 and the upper shield layer 5, and the additional protective layer 12 prevents generation of short-circuit between the lead layer 2 and the upper lead layer 3 and the lower shield layer 4.

Figure 6:
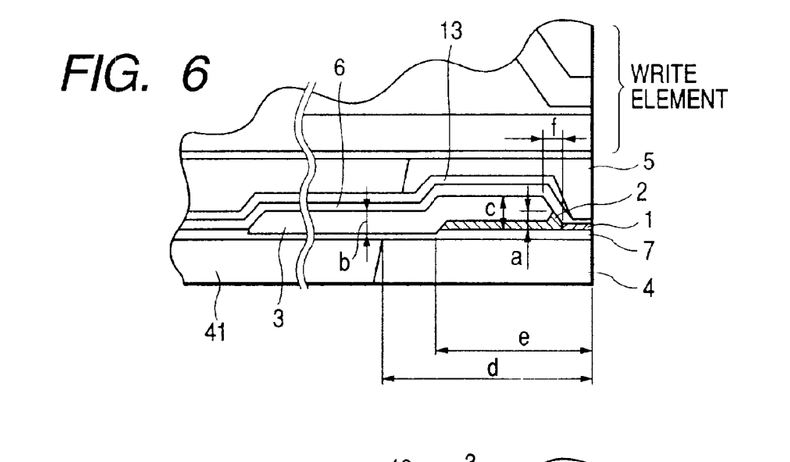
FIG. 6 is a diagram for explaining the thin film head as a third embodiment of the present invention.

Moreover, the integrated thin film head and the manufacturing method thereof as the other embodiment will then be explained with reference to FIG. 6.

Difference of the thin film head of this embodiment from the embodiment of FIG. 1 is that an additional protective layer 13 is provided between the upper readgap layer 6 and the upper shield layer 5. This additional protective layer 13 is a non-magnetic layer of alumina, S102, SiC or the like. The edge of the additional protective layer 13 is located in the side of MR sensor layer 1 than the upper lead layer 3 but is not riding over the MR sensor layer 1.

The reason why the additional protective layer is provided is thought to eliminate the events that if the upper lead layer 3 is provided closely toward the MR sensor layer 1 in order to make small the stepped level difference c–a of the upper lead layer and also make small an electric resistance between the external lead pinouts as in the case of the embodiment explained above, stepped level difference resulting from tile thickness of the upper lead layer 3 and lead layer 2 becomes large, thereby the deposition property of the readgap layer 6 is lowered, and a short-circuit between the upper shield layer 5 and upper lead layer 3 is susceptible to occurrence. The additional protective layer 13 may also be formed under the upper readgap layer 6 and in this case, the identical effect can also be attained.

The thin film head of this embodiment can prevent short-circuit of the upper shield layer by reducing the stepped level difference c–a of the upper lead layer 3 and moreover reduces an electric resistance when the size f is reduced, and the upper additional protective layer 13 prevents generation of short-circuit between the upper lead layer 3 and the upper shield layer 5.

As illustrated in FIG. 9, in this thin film head manufacturing method, the lower shield layer 4 consisting of Permalloy or the like is formed with the plating, sputtering or with the etching by ion milling process on the undercoat layer 11 of alumina or the like formed on the substrate, subsequently the alumina or the like is deposited on the whole surface and then the surface is polished and flattened with lapping, etc. Thereafter, a non-conductive filler material 41 is formed almost matching in its upper surface with the upper surface of the lower shield layer 4 and the lower readgap layer 7 of alumina, $SiO_2$, SiC or the like is then formed thereon with the sputtering method or the like.

Figure 9A:
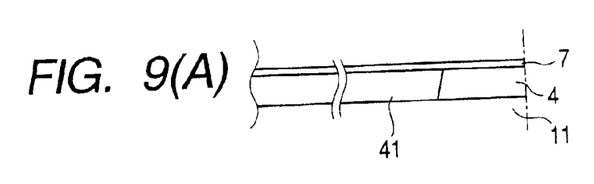
FIG. 9 is a diagram for explaining the method of manufacturing the thin film head as the third embodiment of the present invention.
Figure 9B:
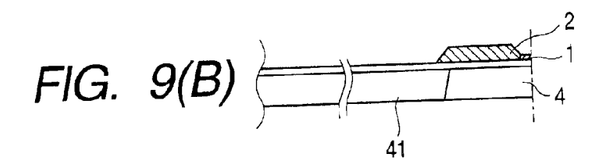
Figure 9C:
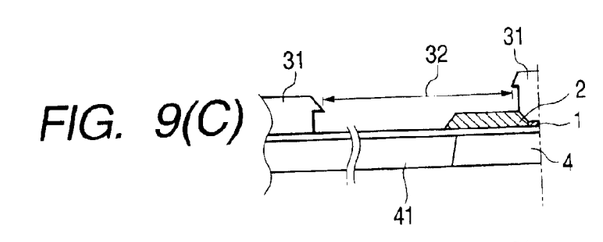
Figure 9D:
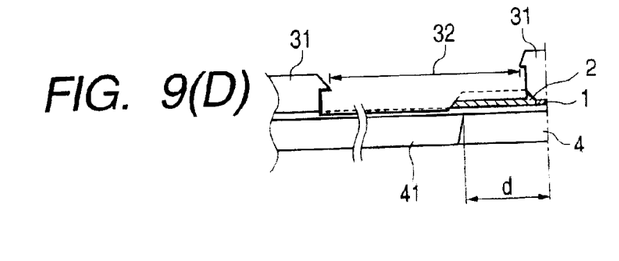

Next, in this manufacturing method, as illustrated in FIG. 9(B), The MR sensor layer 1 and lead layer 2 are formed on the lower gap layer 7. Thereafter, as illustrated in FIG. 9(C), the lift-off profile photoresist pattern 31 of the resist where the part on which the upper lead layer 3 is formed is the aperture 32 is formed and moreover as illustrated in FIG. 9(D), the process to reduce the thickness of the lead layer 2 is executed with the ion milling method using the lift-off profile photoresist pattern 31 as the mask.

Figure 9E:
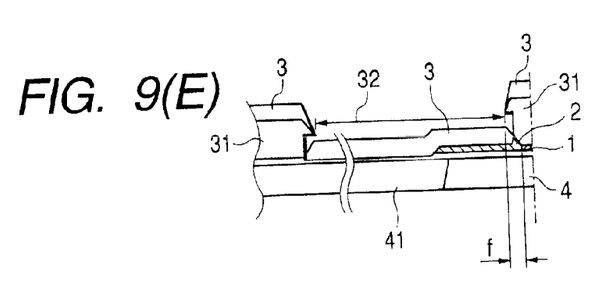
Figure 9F:
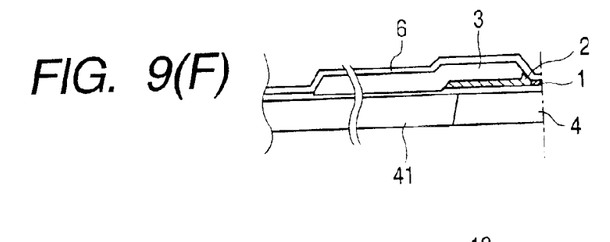
Figure 9G:
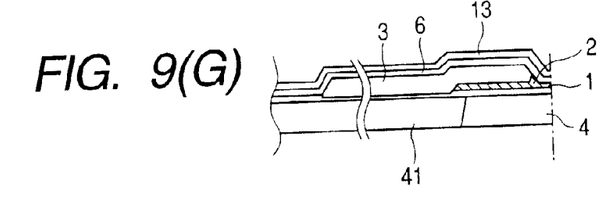

Next, in this manufacturing method, as illustrated in FIG. 9(E), after the upper lead layer 3 consisting of Au, Cu or the like is deposited to the whale surface, the lift-off profile photoresist pattern 31 is removed, the upper lead layer 3 is formed only to the aperture 32 as illustrated in FIG. 9(F), the upper readgap layer 6 is formed on the upper lead layer 3 as illustrated in FIG. 9(G), the non-magnetic additional protective layer 13 of alumina, SiO2, SiC or the like that is the characteristic of this embodiment is formed, and moreover the upper shield layer 5 and inductive head element for data write are formed in view of manufacturing the thin film head.

Figure 7:
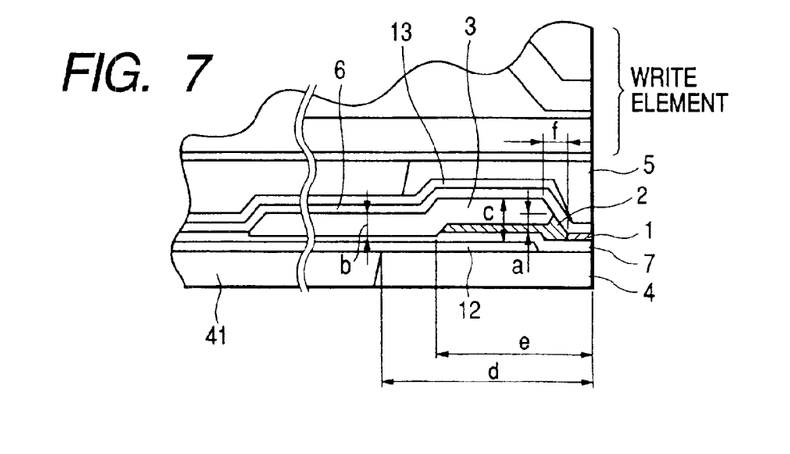
FIG. 7 is a diagram for explaining the thin film head as a fourth embodiment of the present invention.

Moreover, the integrated thin film head of the other embodiment and method of manufacturing the same head will be explained with reference to FIG. 7. Difference of thin film head from the embodiment of FIG. 1 is that both additional protective layer 13 and the additional protective layer 12 are provided. This thin film head can prevent the short- circuit with the lower shield layer when thickness c of the lead layer 2 is reduced to make small the stepped level difference (c–a) and the short-circuit with the upper shield layer S when the upper lead layer 3 is provided near toward the MR sensor layer 1 in order to reduce the electric resistance that are characteristic of this embodiment by providing the additional protective layers of upper and lower readgap explained above.

Figure 10A:
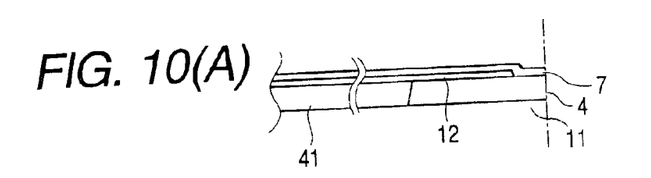
FIG. 10 is a diagram for explaining the method of manufacturing the thin film head as the fourth embodiment of the present invention.
Figure 10B:
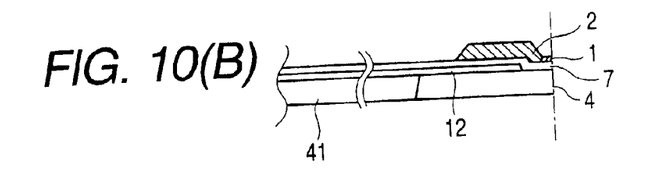
Figure 10C:
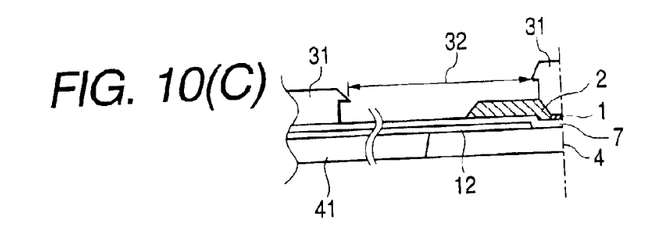
Figure 10D:
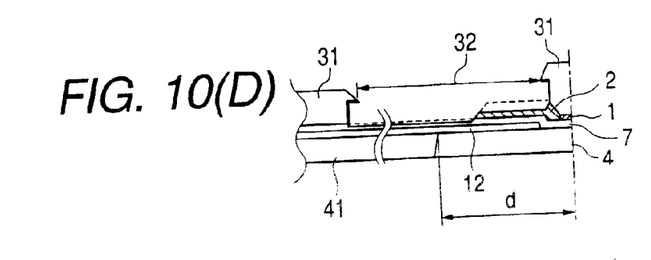
Figure 10E:
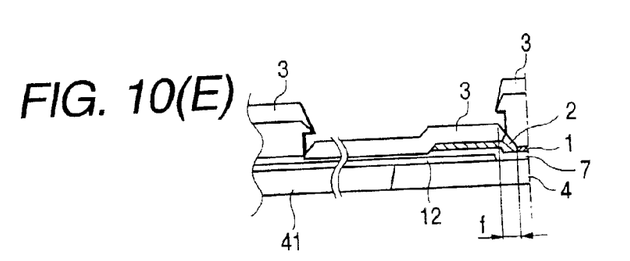
Figure 10F:
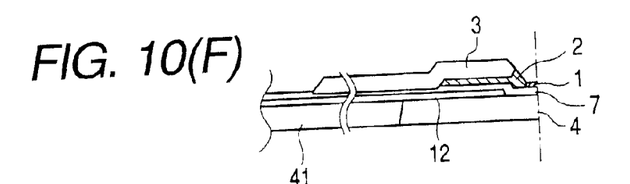
Figure 10G:
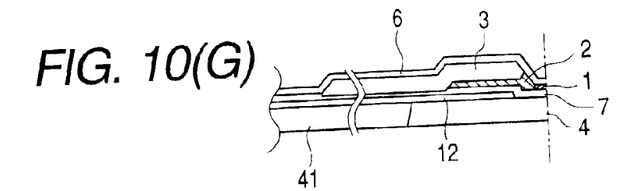
Figure 10H:
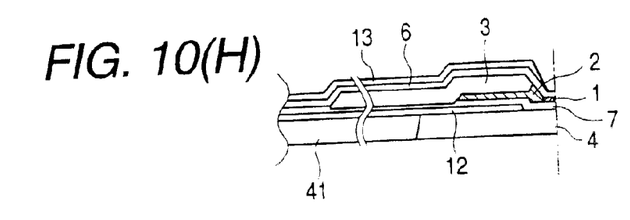

This thin film head manufacturing method manufactures a thin film magnetic head, as illustrated in FIG. 10(A) by forming the lower shield layer 4 of Permalloy with the plating, sputtering or etching with ion milling, etc. on the undercoat layer 11 of alumina or the like formed on the substrate, subsequently depositing alumina to the whole surface and then polishing the surface and flattening the surface with lapping or the like and thereafter forming a non-conductive filler material 41 almost in matching in the surface thereof with the upper surface of the lower shield layer 4, then forming thereon the non-magnetic additional protective layer 12 of alumina, $SiO_2$, SiC or the like as the characteristic of the embodiment, moreover forming the lower readgap layer 7 of alumina, $SiO_2$, SiC or the like with the sputtering method, forming the upper readgap layer 6 on the upper lead layer 3, etc. with the processes B to F of the manufacturing method explained above, then forming the non-magnetic additional protective layer 13 of alumina, $SiO_2$, SiC or the like as the characteristic of the embodiment and moreover forming the upper shield layer 5 and the inductive head element for writing data.

The present invention can also be expressed with the embodiments explained below.

<Embodiment 1>

In an integrated thin film head formed by laminating a read element formed through arrangement of the MR sensor layer at the position facing to the opposing surface of a recording medium within the readgap between the lower shield layer and upper shield layer and a write element using the upper shield layer as the lower core, arranging a coil between the lower core isolated from the upper shield layer and the upper core and then forming a write gap layer at the position facing to the opposing surface of the recording medium between the upper core and lower core, the read element includes a lead layer and an upper lead layer overlapping on the lead layer, the lower lead layer of the upper lead layer is formed thinner than the lead layer of the other part, and c< (a+b) when the thickness of lead layer is a, thickness of upper lead layer is b and thickness of the part where the lead layer and upper lead layer are overlapping with each other is c.

<Embodiment 2>

The integrated thin film magnetic head described in the Embodiment 1, where shape of the lower shield layer is smaller than the shape of the flat lead layer of the upper lead layer forming area.

<Embodiment 3>

A method of manufacturing the integrated thin film head described in the Embodiment 1, comprising the processing steps of forming on the lead layer the resist where the upper lead layer forming area is opened and partially removing the lead layer of the aperture in the thickness direction using the resist as the mask, depositing the upper lead layer material on the resist and aperture, and lifting off the resist and the upper lead layer material on the resist to form the upper lead layer.

As explained above, the present invention can realize a highly reliable and high performance integrated thin film head through the head structure that reduces the MR resistance between the connecting pinouts of the MR sensor layer and can eliminate short-circuit among the lead layer and upper lead layer, lead layer by forming the part not in contact with the upper readgap layer of the lead layer thinner than the part in contact with the upper readgap layer, forming the lower shield layer to be covered with the flat surface shape of the MR sensor layer and lead layer in the size smaller than such flat shape, including the additional protective layer of lower readgap among the lower shield layer, filler material and lower readgap layer and/or including the additional protective layer of lower readgap between the upper readgap layer and the upper shield layer.

What is claimed is:

1. An integrated thin film head, comprising;
   a lower shield layer formed on a substrate;
   a lower readgap layer formed on said lower shield layer;
   an MR sensor layer formed on said lower readgap layer;
   a lead layer joined with maid MR sensor layer;
   an upper lead layer formed partially in contact with said lead layer;
   an upper readgap layer formed to cover said MR sensor layer, lead layer and upper lead layer; and
   an upper shield layer formed on said upper readgap layer,
   wherein a thickness of a part of the lead layer in contact with the upper lead layer is less than a thickness (a) of a part of the lead layer not in contact with the upper lead layer, and thickness (c)< (thickness(a)+ thickness (b)), where thickness (c) is the total thickness of the lead layer and the upper lead layer where the position of the upper lead layer in contact with the lead layer, and thickness (b) is the thickness of a portion of the upper lead layer not in contact with the lead layer.

2. An integrated thin film head according to claim 1, wherein the lower shield layer formed on the substrate has a length (d), measured perpendicular to the read/write surface of the integrated thin film head, that is less than a combined length (e), measured perpendicular to the read/write surface of the integrated thin film head, of the MR sensor layer and lead layer formed on the lower readgap layer.

3. An integrated thin film head according to claim 1, further comprising:
   at least one of a first additional protective layer formed between said lower shield layer and said lower readgap layer, and a second additional protective layer formed between said lower readgap layer and said lead layer and upper lead layer.

4. An integrated thin film head according to claim 1, further comprising:
   at least one of a first additional protective layer formed between said upper shield layer and said upper readgap layer, and a second additional protective layer formed between said upper readgap layer and said lead layer and upper lead layer.

5. An integrated thin film head, comprising:
   an undercoat layer formed on a substrate;
   a lower shield layer,
   a filler material filling a stepped area of said lower shield layer;
   a lower readgap layer formed on said lower shield layer and filler material;
   an MR sensor layer formed at the position facing to the opposing surface of a recording medium on said lower readgap layer;
   a lead layer joined with said HR sensor layer in the reverse side to the opposing surface of recording medium;
   an upper lead layer formed to extend in the reverse direction in contact with a part of said lead layer,
   an upper readgap layer formed to cover said MR sensor layer, lead layer and upper lead layer; and
   an upper shield layer formed on said upper readgap layer,
   wherein a thickness of a part of said lead layer in contact with the upper readgap layer is less than a thickness (a) of a part of the lead layer in contact with the upper readgap layer, and a thickness (c)< (thickness (a)+ thickness (b)), where thickness (c) is the total thickness of the lead layer and the upper lead layer where the portion of the upper lead layer is in contact with the lead layer, and thickness (b) is the thickness of a portion of the upper lead layer not in contact with the lead layer.

6. An integrated thin film head according to claim 5, further comprising:
   at least one of a first additional protective layer formed between said lower shield layer and said lower readgap layer, and a second additional protective layer formed between said lower readgap layer and said lead layer and upper lead layer.

7. An integrated thin film head according to claim 5, wherein said lower shield layer formed on the substrate has a length (d), measured perpendicular to the read/write surface of the integrated thin film head, that is less than a combined length (e) said MR sensor layer and lead layer arid formed on the lower readgap layer.

8. An integrated thin film head according to claim 5, further comprising:
   at least one of a first additional protective layer formed between said upper shield layer and said upper readgap layer, and a second additional protective layer formed between said upper readgap layer and said lead layer and upper lead layer.

9. An integrated thin film head, comprising:
   a lower shield layer formed on a substrate;
   a lower readgap layer formed on said lower shield layer;
   an MR sensor layer farmed on said lower readgap layer;
   a lead layer joined with said MR sensor layer;

an upper lead layer formed partially in contact with said lead layer;

an upper readgap layer formed to cover said MR sensor layer, lead layer and upper lead layer; and an upper shield layer formed on said upper readgap layer, wherein said lead layer includes a first part including a part in contact with said MR sensor and a second part which is continuous with said first part and is thinner than said first part, and said portion of said upper lead layer overlaps said second part of said lead layer; and wherein thickness (c)< (thickness (a)+ thickness (b)), where thickness (a) is the thickness of the first part, thickness (b) is the thickness of a portion of the upper lead layer not in contact with the lead layer, and thickness (c) is the combined thickness of said portion of the upper lead layer overlapping said second part of said lead layer and said second part.

10. An integrated thin film head according to claim 9, further comprising:

at least one additional protective upper layer which is formed between said upper shield layer and said lead layer and upper lead layer, and at least one additional protective lower layer which is formed between said lower shield layer and said lead layer and upper lead layer, wherein said at least one additional upper protective layer includes one of a first additional upper protective layer formed between said upper shield layer and said upper readgap layer, and a second additional upper protective layer formed between said upper readgap layer and said lead layer and upper lead layer, and wherein said at least one additional lover protective layer includes one of a first additional lower protective layer formed between aid lower shield layer and said lower readgap layer, and a second additional lower protective layer formed between said lower readgap layer and said lead layer and upper lead layer.

11. An integrated thin film head according to claim 10, wherein said at least one additional protective lower layer does not extend under said MR sensor layer, and said at least one upper additional protective layer does not extend over said MR sensor layer.

12. An integrated thin film head according to claim 10, wherein each of said additional protective layer is formed of non-magnetic material.

* * * * *